US009316179B2

(12) United States Patent
Kawamura et al.

(10) Patent No.: US 9,316,179 B2
(45) Date of Patent: Apr. 19, 2016

(54) SECONDARY AIR SUPPLY DEVICE FOR INTERNAL COMBUSTION ENGINE

(71) Applicant: Toyota Jidosha Kabushiki Kaisha, Toyota-shi, Aichi-ken (JP)

(72) Inventors: Yusuke Kawamura, Shizuoka-ken (JP); Shinya Kondo, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/300,788

(22) Filed: Jun. 10, 2014

(65) Prior Publication Data

US 2014/0366857 A1    Dec. 18, 2014

(30) Foreign Application Priority Data

Jun. 14, 2013   (JP) ................................. 2013-126061

(51) Int. Cl.
| | |
|---|---|
| *F01N 3/22* | (2006.01) |
| *F01N 11/00* | (2006.01) |
| *F02M 23/08* | (2006.01) |
| *F01N 3/32* | (2006.01) |

(52) U.S. Cl.
CPC ................ *F02M 23/08* (2013.01); *F01N 3/22* (2013.01); *F01N 3/225* (2013.01); *F01N 3/323* (2013.01); *F01N 11/00* (2013.01); *F01N 11/002* (2013.01); *F01N 11/005* (2013.01)

(58) Field of Classification Search
CPC ..... F01N 11/00; F01N 11/002; F01N 11/005; F01N 3/22; F01N 3/225
See application file for complete search history.

(56) References Cited

U.S. PATENT DOCUMENTS

2005/0241300 A1* 11/2005 Nakano et al. ............... 60/289

FOREIGN PATENT DOCUMENTS

| JP | 2005-105958 A | 4/2005 |
|---|---|---|
| JP | 2005-163709 A | 6/2005 |
| JP | 2005-207403 A | 8/2005 |
| JP | 2005-256832 A | 9/2005 |
| JP | 2010-090904 A | 4/2010 |

* cited by examiner

*Primary Examiner* — Lindsay Low
*Assistant Examiner* — Jacob Amick
(74) *Attorney, Agent, or Firm* — Dinsmore & Shohl LLP

(57) ABSTRACT

A secondary air supply device for an internal combustion engine, the secondary air supply device includes a secondary air supply passage, an air pump, a control valve, a pressure sensor and an electronic control unit. The electronic control unit is configured to: (a) when the control valve is opened so that the secondary air supply passage is opened and the air pump is driven, control the air pump to maintain driving of the air pump and control the control valve to close so as to close the secondary air supply passage; (b) calculate a differential pressure between a maximum pressure and a convergence pressure of the pressures within the secondary air supply passage since just after the secondary air supply passage is closed; and (c) calculate a flow amount of secondary air supplied from the secondary air supply passage supplied to the exhaust gas passage based on the differential pressure.

4 Claims, 5 Drawing Sheets

SECONDARY AIR SUPPLY DEVICE FOR INTERNAL COMBUSTION ENGINE

INCORPORATION BY REFERENCE

The disclosure of Japanese Patent Application No. 2013-126061 filed on Jun. 14, 2013 including the specification, drawings and abstract is incorporated herein by reference in its entirety.

BACKGROUND OF THE INVENTION

1. Field of the Invention

The present invention relates to a secondary air supply device configured to supply secondary air to an exhaust gas passage of an internal combustion engine provided with exhaust gas purifying catalyst, and more particularly to a secondary air supply device for an internal combustion engine including a means for calculating a flow amount of the secondary air.

2. Description of Related Art

There has been known that the internal combustion engine is provided with an exhaust air control apparatus in which catalyst having oxidative function is arranged in an exhaust gas passage thereof to reduce carbon monoxide (hereinafter referred to as "CO"), hydrocarbon (hereinafter referred to as "HC") and nitrogen oxide in the exhaust gas (hereinafter referred to as "NOx") to achieve purification of the exhaust gas. Further, there has been known also another secondary air supply device in which, by feeding air with pressure from an air pump to a secondary air supply passage having an on-off valve connected to the exhaust gas passage, the secondary air is supplied into the exhaust gas pipe to intensify the concentration of oxygen, so that HC and CO in the exhaust gas are oxidized to accelerate the purification of the exhaust gas.

If the internal combustion engine is used for a long term, minute particles mixed in intake gas taken from an intake system of the internal combustion engine adheres to an inside wall and the like of the secondary air supply passage so that they are accumulated as deposit. In addition, minute particles in the exhaust gas may also adhere to the inside wall and the like of the secondary air supply passage so that they may be accumulated as deposit. If the accumulation of deposit occurs in the secondary air supply passage, pipe resistance of the secondary air supply passage increases, so that pressure of the secondary air supply passage indicates a different behavior from when no deposit is accumulated within the secondary air supply passage. Then, when calculating the flow amount of the secondary air by means of a pressure sensor provided in the secondary air supply passage, there is a possibility that the flow amount of the secondary air may be determined to have increased by mistake although actually the flow amount of the secondary air has decreased. This sometimes may affect emission of the exhaust gas in the internal combustion engine. Thus, even if any deposit is accumulated within the secondary air supply passage, the secondary air supply device has been demanded to grasp the actual flow amount of the secondary air supplied to the exhaust gas passage by the secondary air supply device with a high accuracy.

Japanese Patent Application Publication No. 2005-163709 (JP 2005-163709 A) has disclosed a secondary air supply device which includes a pressure sensor in the secondary air supply passage between an air pump (AP) and an air switching valve (ASV). By calculating the flow amount of the secondary air based on a pressure detected by the pressure sensor when the air switching valve is opened while the air pump is driven and a pressure detected by the pressure sensor when the air switching valve is closed while the air pump is driven, even if any deposit is accumulated within the secondary air supply passage, the actual flow amount of the secondary air supplied to the exhaust air passage by the secondary air supply device is grasped.

SUMMARY OF THE INVENTION

The secondary air supply device disclosed in JP 2005-163709 A has been invented on the premise that when deposit is accumulated within the secondary air supply passage, a pressure detected by the pressure sensor arranged in the secondary air supply passage rises due to an increase in pipe resistance of the secondary air supply passage compared to a case where no deposit is accumulated within the secondary air supply passage. The secondary air supply device of that invention is configured to calculate an actual flow amount of the secondary air supplied to the exhaust gas passage by means of the secondary air supply device based on this premise.

However, the pressure detected by the pressure sensor arranged within the secondary air supply passage indicates a different behavior between when deposit is accumulated on the upstream side of the pressure sensor and when deposit is accumulated on the downstream side of the pressure sensor. That is, if deposit is accumulated on the downstream side of the pressure sensor within the secondary air supply passage, pipe resistance of the secondary air supply passage increases so that a pressure detected by the pressure sensor rises compared to the case where no deposit is accumulated within the secondary air supply passage. On the other hand, if deposit is accumulated on the upstream side of the pressure sensor within the secondary air supply passage, pipe resistance of the secondary air supply passage increases so that the pressure detected by the pressure sensor decreases compared to the case where no deposit is accumulated within the secondary air supply passage. Thus, the configuration disclosed in JP 2005-163709 A is not suitable for calculation of the actual flow amount of the secondary air supplied to the exhaust gas passage by means of the secondary air supply device if deposit is accumulated on the upstream side of the pressure sensor within the secondary air supply passage.

The present invention provides a secondary air supply device including a means for calculating the flow amount of the secondary air supplied to the exhaust gas passage based on a pressure detected by the pressure sensor arranged within the secondary air supply passage, wherein even if deposit is accumulated on the upstream side of the pressure sensor within the secondary air supply passage, the actual flow amount of the secondary air supplied to the exhaust gas passage can be calculated with a high accuracy.

The secondary air supply device for an internal combustion engine according to an aspect of the present invention, the secondary air supply device includes: a secondary air supply passage, an air pump, a control valve, a pressure sensor and an electronic control unit. The secondary air supply passage is configured to supply secondary air to an exhaust gas passage of the internal combustion engine provided with exhaust gas purifying catalyst. The air pump is configured to supply the secondary air to the secondary air supply passage. The control valve is arranged on a downstream side of the air pump. The control valve is configured to open/close the secondary air supply passage. The pressure sensor is arranged between the air pump and the control valve. The pressure sensor is configured to detect a pressure within the secondary air supply passage. The electronic control unit configured to: (a) control the air pump and the control valve; (b) when the control valve is opened so that the secondary air supply passage is opened and the air pump is driven, control the air pump to maintain driving of the air pump and control the control valve to close so as to close the secondary air supply passage; (c) detect progress of a fluctuation in the pressure within the secondary air supply passage since just after the secondary air supply passage is closed, by the pressure sensor; (d) calculate a differential pressure between a maximum pressure and a convergence pressure of the pressures within the secondary air supply passage since just after the secondary air supply passage is closed; and (e) calculate a flow amount of the secondary air supplied from the secondary air supply passage supplied to the exhaust gas passage based on the differential pressure.

According to the secondary air supply device of an aspect of the present invention, under an operating condition in which the secondary air supply passage is opened while the air pump is driven, the secondary air supply passage is closed by the control valve with driving of the air pump maintained. Then, by detecting a maximum pressure which is produced just after the closing is detected by the pressure sensor arranged between the air pump and the control valve, a pressure (total pressure) which is a sum of static pressure proportional to the performance of the air pump and dynamic pressure proportional to the flow amount of the secondary air passing the control valve is detected. On the other hand, by detecting a convergence pressure in pressure fluctuation convergence state which is produced via pressure reduction fluctuation after the maximum pressure is generated by means of the pressure sensor, static pressure proportional to an amount corresponding to the performance of the air pump, that is, a pressure including the static pressure alone proportional to the performance of the air pump excluding an amount corresponding to the dynamic pressure proportional to the flow amount of the secondary air is detected. By calculating a differential pressure between the maximum pressure and the convergence pressure described above, a pressure including the dynamic pressure alone proportional to the flow amount of the secondary air is calculated and the actual flow amount of the secondary air supplied to the exhaust gas passage is calculated based on the differential pressure. According to an aspect of the present invention, even if deposit is accumulated within the secondary air supply passage on the upstream side of the pressure sensor, the actual flow amount of the secondary air to the exhaust gas passage is calculated with a high accuracy.

In the secondary air supply device according to an aspect of the present invention, the electronic control unit may be configured to: (f) update the maximum pressure with the maximum pressure value, detected by the pressure sensor, in the secondary air supply passage; (g) calculate an average rate of change of the pressure within the secondary air supply passage in a second predetermined period; (h) when the state in which updating of the maximum pressure is not performed longer than a first predetermined period and the average rate of change changes into a predetermined range, determine that the pressure within the secondary air supply passage has converged; and (i) calculate an average pressure of the pressure within the secondary air supply passage, as the convergence pressure, in a third predetermined period subsequent to the second predetermined period when the electronic control unit determines that the fluctuation in the pressure has converge.

In the secondary air supply device according to an aspect of the present invention, the electronic control unit may be configured to: (j) update the maximum pressure with the maximum pressure value, detected by the pressure sensor, in the secondary air supply passage; (k) calculate an average rate of change of the pressure within the secondary air supply passage in a second predetermined period; (l) when the state in which updating of the maximum pressure is not performed longer than a first predetermined period continues and the average rate of change changes from a negative rate of change to zero or a positive rate of change, determine that the pressure within the secondary air supply passage has converged; and (m) calculate an average pressure of the pressure within the secondary air supply passage, as the convergence pressure, in a third predetermined period subsequent to the second predetermined period when the electronic control unit determines that the fluctuation in the pressure has converge.

In the secondary air supply device according to an aspect of the present invention, the electronic control unit may be configured to: (n) when a fourth predetermined period has passed just after the secondary air supply passage is closed, determine that the fluctuation in the pressure has converged; and (o) assume an average pressure in a fifth predetermined period subsequent to after the fourth predetermined period has passed as the convergence pressure.

According to the secondary air supply device of an aspect of the present invention, the secondary air supply device includes a means for calculating the flow amount of the secondary air supplied to the exhaust gas passage based on a pressure detected by the pressure sensor arranged within the secondary air supply passage, and, even if deposit is accumulated within the secondary air supply passage on the upstream side of the pressure sensor, calculates the actual flow amount of the secondary air to the exhaust gas passage with a high accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
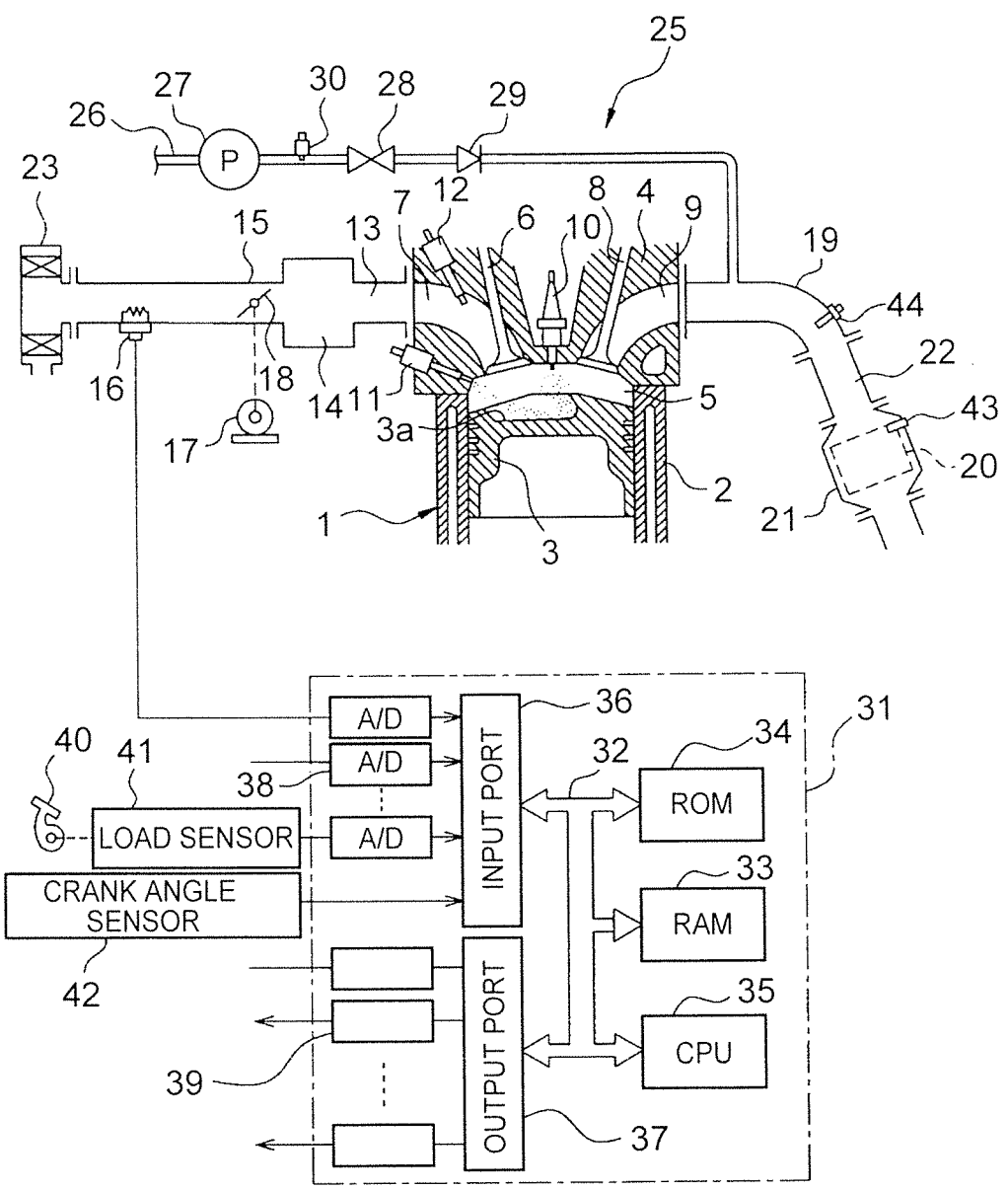
FIG. 1 is a schematic diagram illustrating a secondary air supply device for an internal combustion engine according to the present invention.

Hereinafter, the embodiments of the present invention will be described with reference to the accompanying drawings. Like reference numerals are attached to like components in each drawing. The present embodiment will be described regarding an internal combustion engine arranged in a vehicle.

FIG. 1 is a schematic diagram showing a secondary air supply device for an internal combustion engine according to the present invention. The internal combustion engine of the present embodiment is of spark-ignition type. The internal combustion engine includes an engine main body 1. The engine main body 1 includes a cylinder block 2 and a cylinder head 4. A piston 3 is arranged inside the cylinder block 2. The piston 3 reciprocates inside the cylinder block 2. The embodiment shown in FIG. 1 indicates an embodiment of the internal combustion engine to which the secondary air supply device based on the present invention may be applied and the present invention is not restricted to this example. For example, other embodiments may not be a spark-ignition type internal combustion engine like the embodiment shown in FIG. 1 and further may not include both a cylindrical fuel injection valve and an intake passage fuel injection valve and may not be configured to introduce secondary air from the downstream side of an air cleaner. The secondary air supply device based on the present invention may be applied to not only the internal combustion engine but a device which includes a pressure-feeding device, a pressure sensor and a valve.

In the present embodiment, space which is surrounded by the crown surface of a piston 3 and a cylinder head 4 when the piston 3 reaches a top dead center is called combustion chamber. The combustion chamber 5 is formed in each cylinder. An intake air passage and an exhaust gas passage are connected to the combustion chamber 5. The intake air passage is a passage for supplying air or mixture of fuel and air to the combustion chamber 5. The exhaust gas passage is a passage for discharging exhaust gas generated by combustion of fuel from the combustion chamber 5.

An intake port 7 and an exhaust port 9 are formed in the cylinder head 4. An intake valve 6 is arranged at an end of the intake port 7 and configured to be able of opening/closing the intake air passage which communicates with the combustion chamber 5. An exhaust valve 8 is arranged at an end of the exhaust port 9 and configured to be capable of opening/closing the exhaust gas passage which communicates with the combustion chamber 5. An ignition plug 10 which serves as an ignition device is fixed to the cylinder head 4.

The internal combustion engine of the present embodiment includes a fuel injection valve 11 which serves as a cylinder fuel injection valve for injecting fuel to the inside of the combustion chamber 5. The fuel injection valve 11 injects fuel directly into the cylinder. A cavity 3a which extends from downward of the fuel injection valve 11 to downward of the ignition plug 10 is formed in the top surface of the piston 3. When fuel is injected from the fuel injection valve 11 in compression step, fuel-air mixture containing fuel flows along the cavity 3a. Fuel gathers in the vicinity of the ignition plug 10 to intensify the degree of the stratification. Further, the internal combustion engine of the present invention includes a fuel injection valve 12 which serves as an intake air passage fuel injection valve for injecting fuel into the intake air passage. The fuel injection valve 12 of the present embodiment is arranged to inject fuel to the inside of the intake port 7.

The internal combustion engine of the present embodiment supplies fuel stored in a fuel tank to the fuel injection valves 11, 12 by means of a fuel pump. Further, a high-pressure pump for raising the pressure of fuel is arranged in a passage for supplying fuel to the fuel injection valve 11 configured to inject fuel into the cylinder.

The intake port 7 of each cylinder is connected to a surge tank 14 via a corresponding intake branch pipe 13. The surge tank 14 is connected to an air cleaner 23 via an intake duct 15. An airflow meter 16 for detecting the amount of intake air is arranged in the intake duct 15. A throttle valve 18 which is driven by a step motor 17 is arranged in the intake duct 15. On the other hand, the exhaust port 9 of each cylinder is connected to the exhaust gas passage 19. The exhaust gas passage 19 is connected to an exhaust gas processing device 21 via an exhaust pipe 22. The exhaust gas processing device 21 of the present embodiment includes an exhaust gas purifying catalyst 20. As the exhaust gas purifying catalyst 20, any catalyst having an activation temperature for achieving a predetermined purification rate can be adopted. Such catalysts as three-way catalyst, oxidation catalyst or NOx purifying catalyst may be adopted.

The internal combustion engine of the present embodiment includes an electronic control unit 31 which functions as a control unit. The electronic control unit 31 of the present embodiment contains a digital computer. The electronic control unit 31 includes a RAM (random access memory) 33, a ROM (read-only memory) 34, a CPU (microprocessor) 35, an input port 36, and an output port 37, which are connected mutually via bidirectional bus 32.

An output signal of the airflow meter 16 is input to the input port 36 via a corresponding AD converter 38. A load sensor 41 is connected to an accelerator pedal 40. The load sensor 41 generates an output voltage proportional to a depressing amount of the accelerator pedal 40. This output voltage is input to the input port 36 via the corresponding AD converter 38.

A crank angle sensor 42 generates an output pulse each time when a crank shaft rotates by a predetermined angle, for example, and this output pulse is input to the input port 36. An engine speed can be detected according to an output of the crank angle sensor 42. Further, the output of the crank angle sensor 42 enables a crank angle to be detected at any time.

As regards gas which contains gas burnt in the combustion chamber 5 and is supplied to an exhaust gas passage and the like on the upstream side of the exhaust gas processing device 21, a ratio between air and fuel (hydrocarbon) is called exhaust gas air-fuel ratio (A/F). The exhaust gas passage is provided with an air-fuel ratio sensor 44 for detecting the air-fuel ratio of exhaust gas of gas which flows out of the combustion chamber 5. As a temperature detecting unit for detecting a temperature of an end portion on the upstream side of the exhaust gas purifying catalyst 20 (hereinafter referred to as "front end temperature"), a temperature sensor 43 is arranged at an end portion on the upstream side of the exhaust gas purifying catalyst 20. The temperature sensor 43 functions as a temperature acquisition means for acquiring a front end temperature. An output of the air-fuel ratio sensor 44 and an output of the temperature sensor 43 are input to the input port 36 via the corresponding AD converter 38.

An output port 37 of the electronic control unit 31 is connected to the fuel injection valves 11, 12 and the ignition plug 10 via each corresponding drive circuit 39. The electronic control unit 31 of the present embodiment is configured to perform fuel injection control and ignition control. That is, a fuel injection timing and a fuel injection amount are controlled by the electronic control unit 31.

In the present embodiment, the fuel injection valve 11 and the fuel injection valve 12 are controlled independently. That is, the fuel injection amount/the fuel injection timing from the fuel injection valve 11 and the fuel injection amount/the fuel injection timing from the fuel injection valve 12 are controlled individually.

Further, the ignition timing of the ignition plug 10 is controlled by the electronic control unit 31. The output port 37 is connected to the step motor 17 configured to drive the throttle valve 18 via the corresponding drive circuit 39. These components are controlled by the electronic control unit 31.

The internal combustion engine of the present embodiment includes a secondary air supply device 25 configured to supply air to an exhaust gas passage on the upstream side with respect to the exhaust gas purifying catalyst 20. The secondary air supply device 25 includes a secondary air supply passage 26 which connects the intake duct 15 and the exhaust gas passage 19. In the intake duct 15, the secondary air supply passage 26 may be connected on the downstream side of the air cleaner 23 and on the upstream side of the airflow meter 16, and may be configured to fetch the secondary air directly from the atmosphere. Further, the secondary air supply device 25 includes an air pump 27 which is driven by an electric motor and an air switching valve (ASV) 28 which corresponds to the control valve. The air pump 27 pressurizes air inside the intake duct 15 and supplies the pressurized air to the exhaust gas passage 19. Further, a check valve 29 for preventing backflow of air is arranged in the secondary air supply passage 26. A pressure sensor 30 for detecting a pressure in the secondary air supply passage 26 is arranged between the air pump 27 and the air switching valve 28.

An output of the pressure sensor 30 is input to the electronic control unit 31. The output port 37 of the electronic control unit 31 is connected to the air pump 27 and the air switching valve 28 via the corresponding drive circuit 39. In this way, the secondary air supply device 25 is controlled by the electronic control unit 31.

The secondary air supply device 25 of the present embodiment is used, for example, in a situation in which the temperature of the exhaust gas purifying catalyst 20 has not been raised sufficiently at the time of cold start or the like of the internal combustion engine. That is, it is used when the exhaust gas purifying catalyst 20 has not reached the activation temperature.

At the time of cold start of the internal combustion engine, the air switching valve 28 is opened and at the same time, the air pump 27 is driven. Part of air passing the air cleaner 23 passes through the secondary air supply passage 26 and is supplied into the exhaust gas passage 19. Oxygen is supplied to exhaust gas flowing through the exhaust gas passage 19. Exhaust gas flowing out of the combustion chamber 5 contains unburnt hydrocarbon and carbon monoxide. The temperature of the exhaust gas flowing out of the combustion chamber 5 is high and by supplying oxygen by means of the secondary air supply device, the unburnt hydrocarbon and carbon monoxide can be oxidized. At this time, the temperature of the exhaust gas can be raised by heat generated by oxidation.

The high-temperature exhaust gas can be supplied to the exhaust gas purifying catalyst 20 thereby accelerating increase in temperature of the exhaust gas purifying catalyst 20. As a result, the temperature of the exhaust gas purifying catalyst 20 can be increased over the activation temperature in a short time. That is, emission of exhaust gas into the atmosphere in a state in which it has not been purified sufficiently by the exhaust gas purifying catalyst 20 can be prevented.

Further, if the exhaust gas purifying catalyst 20 has oxidation function, the air-fuel ratio of exhaust gas can be made lean by supplying air to the exhaust gas and supplied to the exhaust gas purifying catalyst 20. The unburnt hydrocarbon and carbon monoxide can be oxidized by the exhaust gas purifying catalyst 20 thereby accelerating increase in temperature of the exhaust gas purifying catalyst 20.

By the way, the pressure detected by the pressure sensor 30 arranged in the secondary air supply passage 26 indicates a different behavior between when deposit is accumulated on the upstream side of the pressure sensor 30 and when deposit is accumulated on the downstream side of the pressure sensor 30.

Figure 2:
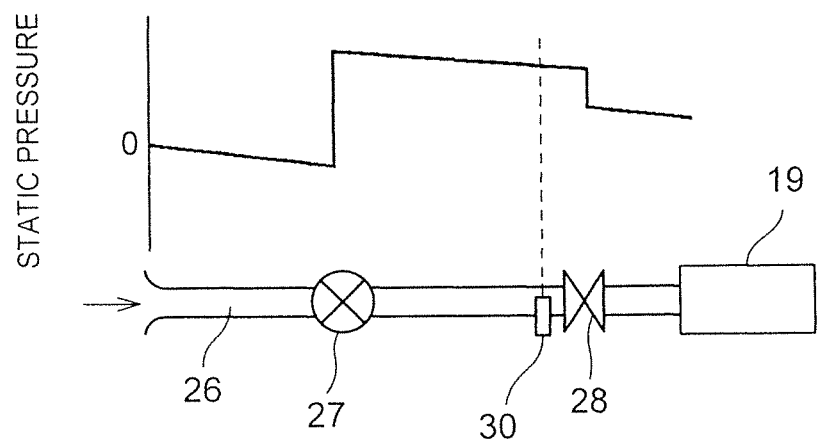
FIG. 2 is a diagram showing a static pressure distribution in the longitudinal direction of the secondary air supply passage in an operating state in which the air switching valve is opened while the air pump is driven or an example of the static pressure distribution at an ordinary time when no deposit is accumulated in the secondary air supply passage on the upstream side of the pressure sensor.

FIG. 2 shows a static pressure distribution in the longitudinal direction of the secondary air supply passage in an operating condition in which the air switching valve is opened while the air pump is driven or a diagram indicating an example of the static pressure distribution at a normal time when no deposit is accumulated in the secondary air supply passage on the upstream side of the pressure sensor. On the other hand, FIG. 3 shows a static pressure distribution in the longitudinal direction of the secondary air supply passage in the operating condition in which the air switching valve is opened while the air pump is driven or particularly, a diagram indicating an example of the static pressure distribution when pipe resistance is generated due to the accumulation of deposits in the secondary air supply passage on the upstream side of the air pressure sensor, particularly on the upstream side of the air pump.

Figure 3:
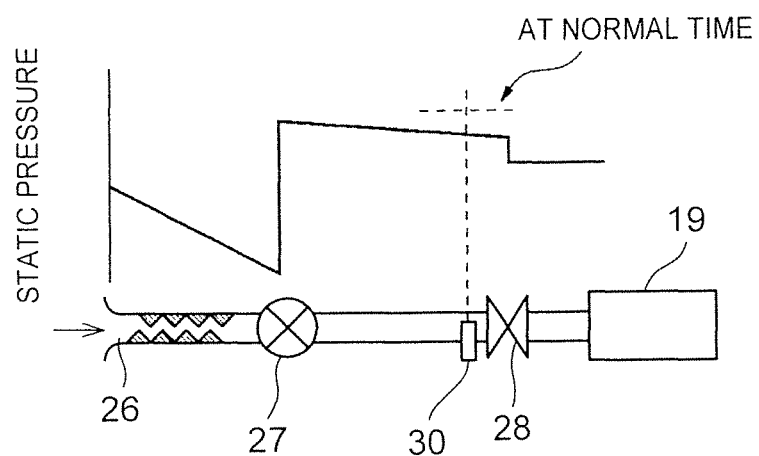
FIG. 3 is a diagram showing a static pressure distribution in the longitudinal direction of the secondary air supply passage in an operating state in which the air switching valve is opened while the air pump is driven or a diagram showing an example of the static pressure distribution when pipe resistance is generated due to the accumulation of deposits in the secondary air supply passage on the upstream side of the air pressure sensor, particularly on the upstream side of the air pump.

As understood from FIG. 3, if deposit is accumulated in the secondary air supply passage on the upstream side of the air pump 27, reduction of pressure until the air pump 27 is reached is larger than a case where no deposit is generated. Accompanied by this, compared to the case where no deposit is generated, when deposit has been generated, the pressure detected by the pressure sensor 30 in the operating condition in which the air switching valve 28 is opened while the air pump 27 is driven is detected to be lowered.

The present invention aims at providing a secondary air supply device for internal combustion engine configured to include a means capable of calculating the actual flow amount of the secondary air to the exhaust gas passage 19 with a high accuracy even if the behavior of pressure detected by the pressure sensor 30 indicates such a behavior. That is, the present invention aims at providing a secondary air supply device having a means for calculating the flow amount of the secondary air to the exhaust gas passage 19 based on a pressure detected by the pressure sensor 30 arranged in the secondary air supply passage 26 or a secondary air supply device which is configured to include a means capable of calculating the actual flow amount of the secondary air to the exhaust gas passage with a higher accuracy even if deposit is accumulated on the upstream side of the pressure sensor 30 in the secondary air supply passage 26.

To achieve provision of such a secondary air supply device, the secondary air supply device for internal combustion engine of the present invention includes a secondary air flow amount calculating means for calculating the flow amount of the secondary air supplied to the exhaust gas passage. In the secondary air flow amount calculating means, in an operating condition in which the secondary air supply passage 26 is opened while the air pump 27 is driven, the secondary air supply passage 26 is closed by means of the control valve or the air switching valve 28 with driving of the air pump 27 maintained. Just after the secondary air supply passage 26 is closed, a progress of fluctuation in pressure in the secondary air supply passage 26 is detected by the pressure sensor 30 and a differential pressure between a maximum pressure and a convergence pressure detected by the pressure sensor 30 just after the secondary air supply passage 26 is closed is calculated. Based on the differential pressure, the flow amount of the secondary air supplied to the exhaust gas passage 19 is calculated.

That is, in the operating condition in which the secondary air supply passage 26 is opened while the air pump 27 is driven, the secondary air flow amount calculating means of the present invention closes the secondary air supply passage 26 by means of the air switching valve 28 with driving of the air pump 27 maintained, and detects a maximum pressure produced just after that closing by means of the pressure sensor 30 arranged between the air pump 27 and the air switching valve 28. Then, a pressure (total pressure) which is a sum of a static pressure proportional to the performance of the air pump 27 and a dynamic pressure proportional to the flow amount of the secondary air passing the air switching valve 28 is detected. On the other hand, by detecting a convergence pressure in a pressure fluctuation convergence state which is produced via a pressure reduction fluctuation after the maximum pressure is generated by means of the pressure sensor 30, the static pressure proportional to an amount corresponding to the performance of the air pump 27 alone, i.e., a pressure including the amount corresponding to the static pressure alone proportional to the amount corresponding to the performance of the air pump 27 excluding the dynamic pressure proportional to the flow amount of the secondary air is detected.

Then, by calculating the differential pressure between the maximum pressure and the convergence pressure as described above, the pressure including the dynamic pressure alone proportional to the flow amount of the secondary air is calculated, so that, based on the differential pressure, the actual flow amount of the secondary air supplied to the exhaust gas passage 19 can be calculated. According to the present invention, even if deposit is accumulated within the secondary air passage on the upstream side of the pressure sensor 30, the actual flow amount of the secondary air to the exhaust gas passage 19 can be calculated with a higher accuracy.

Figure 4:
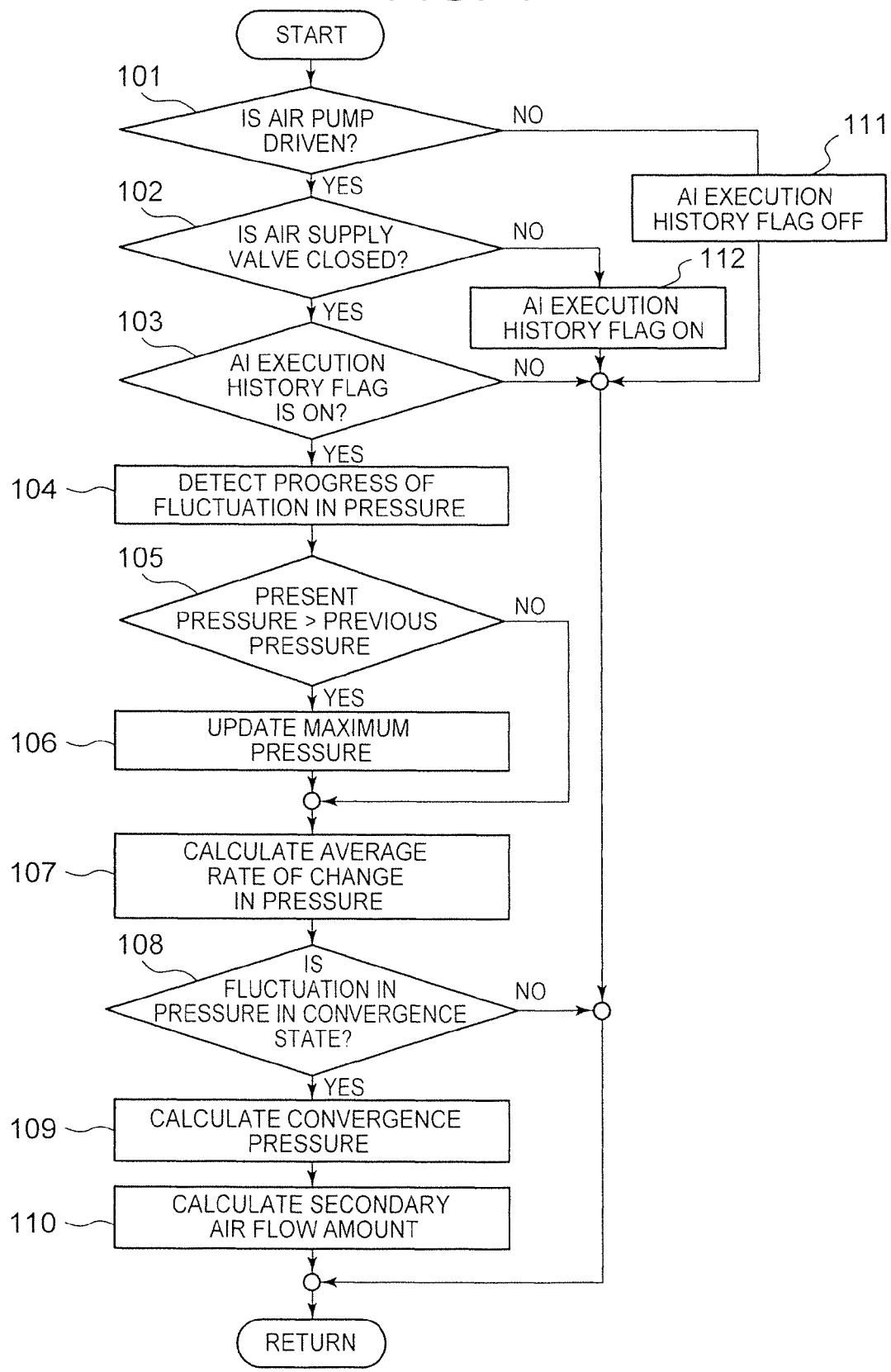
FIG. 4 is a diagram showing an example of a flow chart for calculating the secondary air flow amount by means of a secondary air flow amount calculating means according to the present invention.

FIG. 4 is a diagram showing an example of the flow chart for calculating the secondary air flow amount by means of the secondary air flow amount calculating means of the present invention. In the secondary air flow amount calculating process by means of the secondary air flow amount calculating means shown in FIG. 4, first, whether or not the operating condition of the secondary air supply device is suitable for detecting the pressure by the pressure sensor 30 is determined to calculate the flow amount of the secondary air supplied to the exhaust gas passage 19.

In step 101, whether or not the air pump 27 is driven is determined to perform such a determination, and in subsequent step 102, whether or not the secondary air supply passage 26 has been closed by the air switching valve 28 which serves as a control valve is determined. Then, in subsequent step 103, whether or not secondary air supply execution history flag (AI execution history flag) is ON, that is, whether or not the state prior to execution of the determination of steps 101 and 102 is in the operating condition in which the secondary air supply passage 26 is opened while the air pump 27 is driven is determined. Then, in step 101, it is determined that driving of the air pump 27 is maintained and in step 102, it is determined that the air switching valve has been closed. In step 103, if it is determined that the condition prior to execution of the determination in steps 101 and 102 has been in the operating condition in which the secondary air supply passage 26 is opened while the air pump 27 is driven, the processing proceeds to subsequent step 104.

In step 104, detection of a progress of fluctuation in pressure in the secondary air supply passage 26 just after the secondary air supply passage 26 is closed by means of the pressure sensor 30 arranged between the air pump 27 and the air switching valve 28 is started.

Figure 5:
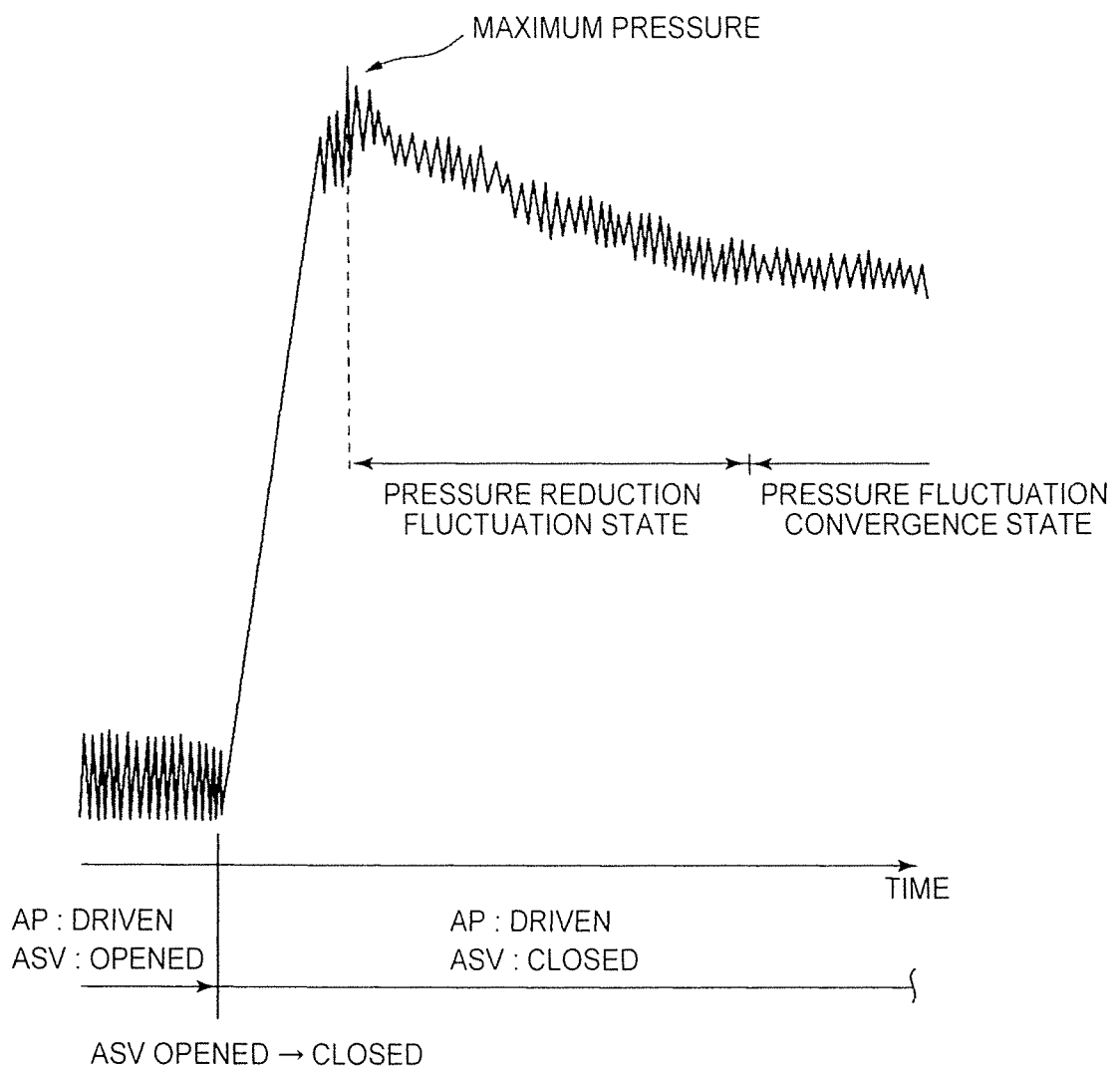
FIG. 5 is a diagram showing an example of a progress of fluctuation in pressure detected by the pressure sensor just after the secondary air supply passage is closed with a control valve with driving of the air pump maintained in an operating state in which the secondary air supply passage is opened while the air pump is driven.

FIG. 5 is a diagram showing an example of the progress of fluctuation in pressure detected by the pressure sensor just after the secondary air supply passage is closed by the control valve with driving of the air pump maintained in the operating condition in which the secondary air supply passage is opened and the air pump is driven. Just after the secondary air supply passage 26 is closed by the air switching valve 28, as described above, the pressure sensor 30 detects a pressure (total pressure) which is a sum of the static pressure proportional to the performance of the air pump 27 and the dynamic pressure proportional to the flow amount of the secondary air passing the air switching valve 28. That is, as understood from FIG. 5, the pressure detected by the pressure sensor 30 rises abruptly just after the secondary air supply passage 26 is closed, so that the maximum pressure corresponding to the pressure (total pressure) which is a sum of the static-pressure and the dynamic pressure as described above with some extent of pulsation is reached, followed by fluctuation with reduction in pressure, whereby leading to convergence of the pressure fluctuation.

Thus, in the secondary air flow amount calculating process by means of the secondary air flow amount calculating means shown in FIG. 4, the progress of fluctuation in pressure within the secondary air supply passage just after the secondary air supply passage is closed is detected by means of the pressure sensor, and in step 105 following step 104, a previous detected value by the pressure sensor 30 is compared to the present detected value. If the present detected value is larger, in step 106 following step 105, the present detected value is updated with the maximum pressure value and just after the secondary air supply passage 26 is closed by the air switching valve 28, a maximum pressure in the secondary air supply passage presented to the pressure sensor 30 is determined. By determining the maximum pressure within the secondary air supply passage presented to the pressure sensor 30, the pressure (total pressure) which is a sum of the static pressure proportional to the performance of the air pump 27 and the dynamic pressure proportional to the flow amount of the secondary air passing the air switching valve 28 can be grasped with a high accuracy.

In step 107 and step 108 following step 106, whether or not the fluctuation in pressure detected by the pressure sensor 30 just after the secondary air supply passage 26 is closed is in a convergence state following the fluctuation with reduction in pressure after the maximum pressure is reached is determined.

In the secondary air flow amount calculating process by means of the secondary air flow amount calculating means shown in FIG. 4, when the state in which the updating of the maximum pressure detected by the pressure sensor 30 is not performed longer than a first predetermined period continues in the progress of the pressure fluctuation and an average rate of change in a second predetermined period falls within a predetermined range, the electronic control unit 31 determines that the fluctuation in the pressure has converged. That is, in the secondary air flow amount calculating process by means of the secondary air amount calculating means shown in FIG. 4, when the state in which updating of the maximum pressure determined in steps 105 and 106 is not performed longer than the first predetermined period continues and the average rate of change (pressure gradient) of the pressure detected by the pressure sensor 30 in the second predetermined period falls within the predetermined range, the electronic control unit 31 determines that the fluctuation in the pressure has converged. By the way, the predetermined ranges of the first predetermined period and the second predetermined period are set appropriately within a range capable of reducing influences of dispersion of detection data based on preliminarily executed evaluation tests and analysis evaluation.

Determining whether or not the fluctuation in pressure detected by the pressure sensor 30 just after the secondary air supply passage 26 is closed is in the convergence state produced via the pressure reduction fluctuation after the maximum pressure is generated is not restricted to such a process, but may be performed by other process. As described previously, the pressure detected by the pressure sensor 30 rises abruptly just after the secondary air supply passage 26 is closed, so that the maximum pressure is reached with some extent of pulsation, followed by pressure reduction fluctuation, whereby leading to convergence of the pressure fluctuation. The average rate of change of the pressure after the maximum pressure is generated progresses with negative rates of change. Then, in an aspect of the progress from the pressure reduction fluctuation state to the pressure fluctuation convergence state, the average rate of change of the pressure changes from a negative rate of change to zero or in some cases, to a positive rate of change due to dispersion thereof.

Thus, in another secondary air flow amount calculating process, if in a progress of fluctuation in pressure, the state in which the updating of the maximum pressure detected by the pressure sensor 30 is not performed longer than the first predetermined period continues and the average rate of change in the second predetermined time changes from a negative rate of change to zero or in some cases a positive rate of change due to dispersion thereof, it may be determined that the fluctuation in pressure has converged.

In the secondary air flow amount calculating process by means of the secondary air flow amount calculating means shown in FIG. 4, when the state in which the updating of the maximum pressure determined in steps 105 and 106 is not performed longer than the first predetermined period continues and the average rate of change (pressure gradient) of the pressure detected by the pressure sensor 30 in the second predetermined period falls within the predetermined range, the electronic control unit 31 determines that the fluctuation in the pressure has converged. However, in such a determining process, it may be difficult to determine whether the fluctuation in pressure has converged due to air pump performance or pipe resistance condition.

Thus, in still another secondary air flow amount calculating process, a time required for convergence of the fluctuation in pressure of the secondary air may be set as a fourth predetermined period preliminarily and it may be determined that the fluctuation in pressure converges when the fourth predetermined period has passed just after the secondary air supply passage is closed based on preliminarily executed evaluation tests and analysis evaluation.

In steps 107 and 108, if it is determined that the fluctuation in pressure detected by the pressure sensor 30 just after the secondary air supply passage 26 is closed is in the pressure fluctuation convergence state which is produced via the pressure reduction fluctuation after the maximum pressure is generated, the processing proceeds to subsequent step 109. In step 109, as described previously, by detecting the convergence pressure in the pressure fluctuation convergence state which is produced via the pressure reduction fluctuation after the maximum pressure is generated by the pressure sensor 30, the static pressure proportional to an amount corresponding to the performance of the air pump 27 or the pressure including the static pressure alone proportional to the amount corresponding to the performance of the air pump 27 excluding the amount corresponding to the dynamic pressure proportional to the flow amount of the secondary air is detected.

In the secondary air flow amount calculating process by means of the secondary air flow amount calculating means shown in FIG. 4, the average pressure in a third predetermined period subsequent to the second predetermined period which is the period when the fluctuation in pressure is determined to be in the convergence state is assumed as the convergence pressure. Then, by calculating a differential pressure between the maximum pressure and the convergence pressure as described above in step 110 subsequent to step 109, the pressure including the amount corresponding to the dynamic pressure alone proportional to the flow amount of the secondary air may be calculated, and then, the actual flow amount of the secondary air supplied to the exhaust gas passage 19 may be calculated based on the differential pressure. More specifically, by using a map created based on a preliminary test evaluation or analysis evaluation, which relates the differential pressure to the secondary air flow amount, the actual flow amount of the secondary air supplied to the exhaust gas passage 19 is calculated based on the differential pressure between the maximum pressure and the convergence pressure as described above.

Figure 6:
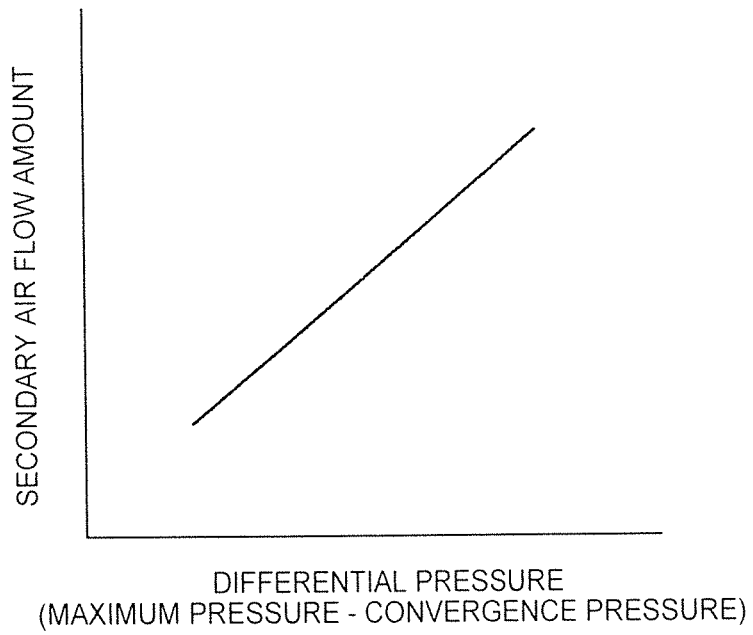
FIG. 6 is a diagram showing an example of a map for use in calculating the secondary air flow amount based on a differential pressure between a maximum pressure and a convergence pressure.

FIG. 6 is a diagram showing an example of a map for use in calculating the flow amount of the secondary air based on the differential pressure between the maximum pressure and the convergence pressure as described above. As understood from FIG. 6, according to the secondary air flow amount calculating means of the secondary air supply device of the present invention in which by calculating the differential pressure between the maximum pressure and the convergence pressure as described above, the pressure including the amount corresponding to the dynamic pressure alone proportional to the flow amount of the secondary air is calculated and the actual flow amount of the secondary air supplied to the exhaust gas passage 19 is calculated based on the differential pressure, the flow amount of the secondary air supplied to the exhaust gas passage is calculated so as to decrease as the differential pressure between the maximum pressure and the convergence pressure decreases as described above.

According to the present invention, even if deposit is accumulated within the secondary air supply passage on the upstream side of the pressure sensor, the actual flow amount of the secondary air to the exhaust gas passage can be calculated with a higher accuracy.

Figure 7:
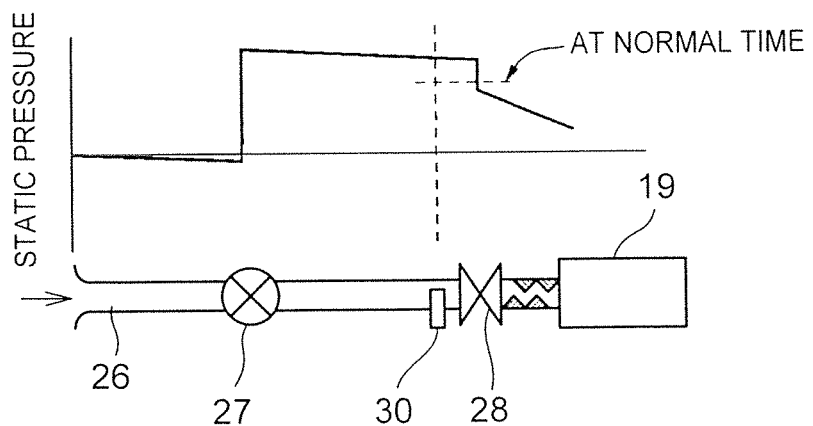
FIG. 7 is a diagram showing a static pressure distribution in the longitudinal direction of the secondary air supply passage in an operating state in which the air switching valve is opened while the air pump is driven or a diagram showing an example of the static pressure distribution when pipe resistance is generated due to the accumulation of deposits in the secondary air supply passage on the downstream side of the air sensor.

FIG. 7 is a diagram showing an example of the static pressure distribution in the longitudinal direction of the secondary air supply passage in the operating condition in which the air switching valve is opened while the air pump is driven or an example of the static pressure distribution when pipe resistance is generated due to the accumulation of deposits in the secondary air supply passage on the downstream side of the pressure sensor. According to the secondary air flow amount calculating means of the secondary air supply device of the present invention as described above, not only if pipe resistance is generated due to the accumulation of deposits in the secondary air supply passage on the upstream side of the pressure sensor, but also if pipe resistance is generated due to the accumulation of deposits within the secondary air supply passage on the downstream side of the pressure sensor, by calculating the differential pressure between the maximum pressure and the convergence pressure as described above, the pressure including the amount corresponding to the dynamic pressure alone proportional to the flow amount of the secondary air can be calculated so that the actual flow amount of the secondary air to the exhaust gas passage can be calculated with a higher accuracy.

What is claimed is:

1. A secondary air supply device for an internal combustion engine, the secondary air supply device comprising:
    a secondary air supply passage configured to supply secondary air to an exhaust gas passage of the internal combustion engine provided with exhaust gas purifying catalyst;
    an air pump configured to supply the secondary air to the secondary air supply passage;
    a control valve arranged on a downstream side of the air pump, the control valve being configured to open/close the secondary air supply passage;
    a pressure sensor arranged between the air pump and the control valve, the pressure sensor being configured to detect a pressure within the secondary air supply passage; and
    an electronic control unit operatively connected to the air pump and the control valve, the electronic control unit configured to:
    (a) control the air pump to maintain driving of the air pump and control the control valve to close so as to close the secondary air supply passage when the control valve is opened so that the secondary air supply passage is opened and the air pump is driven;
    (b) detect progresses of a fluctuation in the pressure within the secondary air supply passage since just after the secondary air supply passage is closed, by the pressure sensor;
    (c) calculate a differential pressure between a maximum pressure and a convergence pressure of the pressures within the secondary air supply passage since just after the secondary air supply passage is closed;
    (d) calculate a flow amount of the secondary air supplied from the secondary air supply passage to the exhaust gas passage based on the differential pressure; and
    (e) control the air pump and the control valve in response to the calculated flow amount of the secondary air supplied from the secondary air supply passage to the exhaust gas passage.

2. The secondary air supply device according to claim 1, wherein
    the electronic control unit is configured to:
    (f) update the maximum pressure with the maximum pressure value, detected by the pressure sensor, in the secondary air supply passage;
    (g) calculate an average rate of change of the pressure within the secondary air supply passage in a second predetermined period;
    (h) when the state in which updating of the maximum pressure is not performed longer than a first predetermined period continues and the average rate of change falls within a predetermined range, determine that the pressure in the secondary air supply passage has converged; and
    (i) calculate an average pressure of the pressure within the secondary air supply passage, as the convergence pressure, in a third predetermined period subsequent to the second predetermined period when the electronic control unit determines that the fluctuation in the pressure has converged.

3. The secondary air supply device according to claim 1, wherein
    the electronic control unit is configured to:
    (j) update the maximum pressure with the maximum pressure value, detected by the pressure sensor, in the secondary air supply passage;
    (k) calculate an average rate of change of the pressure within the secondary air supply passage in a second predetermined period;
    (l) when the state in which updating of the maximum pressure is not performed longer than a first predetermined period continues and the average rate of change changes from a negative rate of change to zero or a positive rate of change, determine that the pressure within the secondary air supply passage has converged; and
    (m) calculate an average pressure of the pressure within the secondary air supply passage, as the convergence pressure, in a third predetermined period subsequent to the second predetermined period when the electronic control unit determines that the fluctuation in the pressure has converged.

4. The secondary air supply device according to claim 1, wherein
    the electronic control unit is configured to:
    (n) when a fourth predetermined period has passed just after the secondary air supply passage is closed, determine that the fluctuation in the pressure has converged; and
    (o) assume an average pressure in a fifth predetermined period subsequent to after the fourth predetermined period has passed as the convergence pressure.

* * * * *